(12) United States Patent
Muraishi

(10) Patent No.: US 12,052,394 B2
(45) Date of Patent: Jul. 30, 2024

(54) INSPECTION SYSTEM, INSPECTION APPARATUS AND METHOD OF CONTROLLING THE SAME, AND STORAGE MEDIUM

(71) Applicant: CANON KABUSHIKI KAISHA, Tokyo (JP)

(72) Inventor: Masaaki Muraishi, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/473,402

(22) Filed: Sep. 25, 2023

(65) Prior Publication Data

US 2024/0106935 A1 Mar. 28, 2024

(30) Foreign Application Priority Data

Sep. 27, 2022 (JP) .................... 2022-154002

(51) Int. Cl.
*H04N 1/00* (2006.01)
(52) U.S. Cl.
CPC ..... *H04N 1/00029* (2013.01); *H04N 1/00015* (2013.01); *H04N 1/00045* (2013.01); *H04N 1/00074* (2013.01); *H04N 1/00082* (2013.01)
(58) Field of Classification Search
CPC ........... H04N 1/00005; H04N 1/00015; H04N 1/00029; H04N 1/00031; H04N 1/00034; H04N 1/00045; H04N 1/00074; H04N 1/00082
USPC ........................................ 358/1.11, 406, 504
See application file for complete search history.

(56) References Cited

U.S. PATENT DOCUMENTS

| 2020/0019353 | A1* | 1/2020 | Okajima | G06F 3/1257 |
| 2020/0128135 | A1* | 4/2020 | Matsushita | G06F 3/1243 |
| 2020/0288030 | A1* | 9/2020 | Tsukamoto | H04N 1/00803 |
| 2022/0116504 | A1 | 4/2022 | Tsukamoto | |

FOREIGN PATENT DOCUMENTS

JP 2021031089 A 3/2021

OTHER PUBLICATIONS

Extended European search report issued in European Appln. No. 23196131.9 mailed on Feb. 22, 2024.

* cited by examiner

*Primary Examiner* — Kent Yip
(74) *Attorney, Agent, or Firm* — ROSSI, KIMMS & McDOWELL LLP

(57) ABSTRACT

An inspection system comprising an image forming apparatus and an inspection apparatus is provided. The inspection apparatus obtains a scanned image by reading a printed matter printed by the image forming apparatus, sets an inspection target area in which inspection is to be performed on data of a variable-data area included in the scanned image, sets an inspection item for the inspection target area, generates, in accordance with the inspection item, a collation value to which the inspection item is to be applied, in a reference image, performs inspection by comparing the reference image including the collation value and a scanned image of an inspection-target printed matter, and performs control so that the generated collation value is able to be confirmed prior to the inspection.

20 Claims, 16 Drawing Sheets

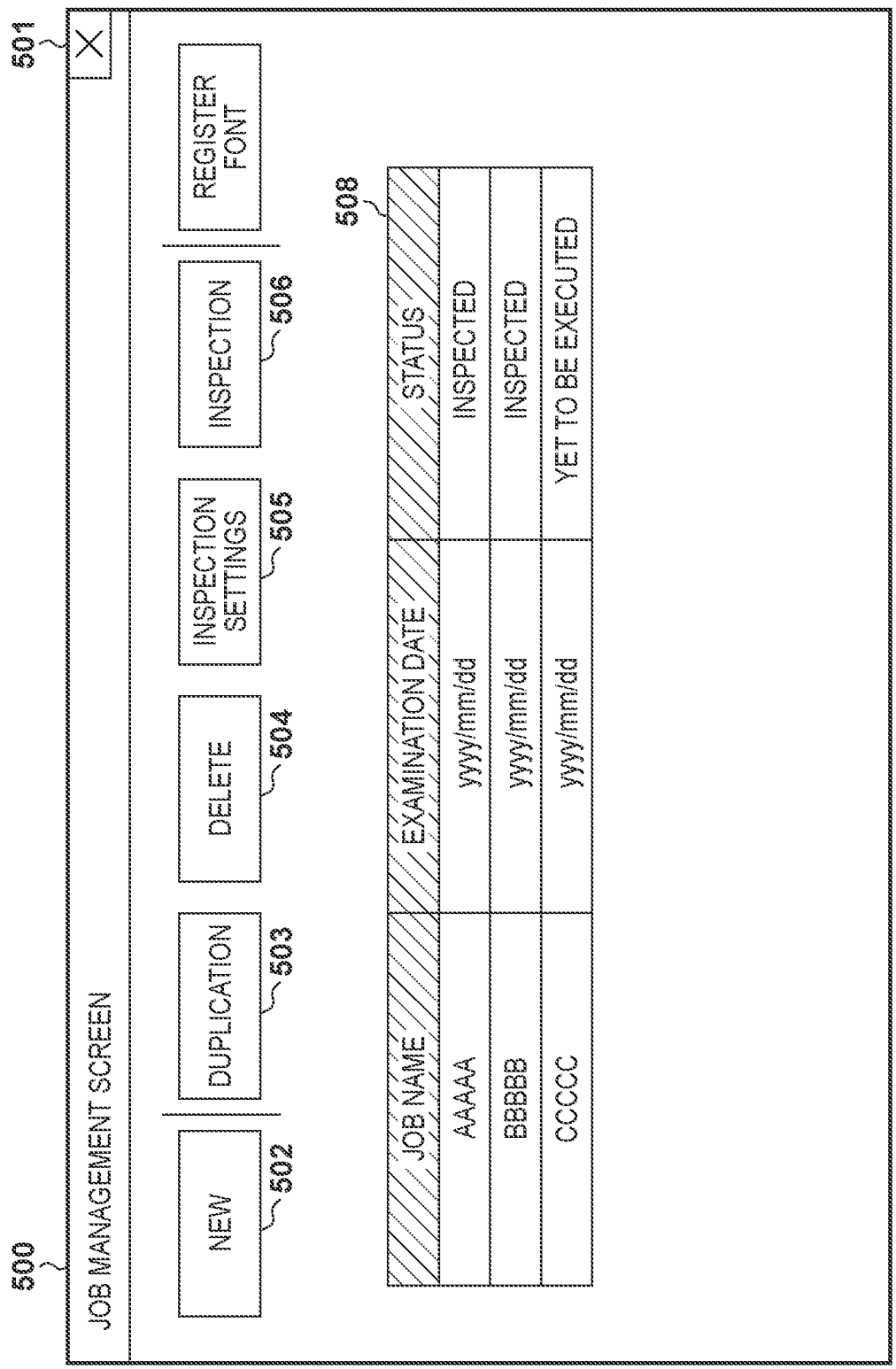

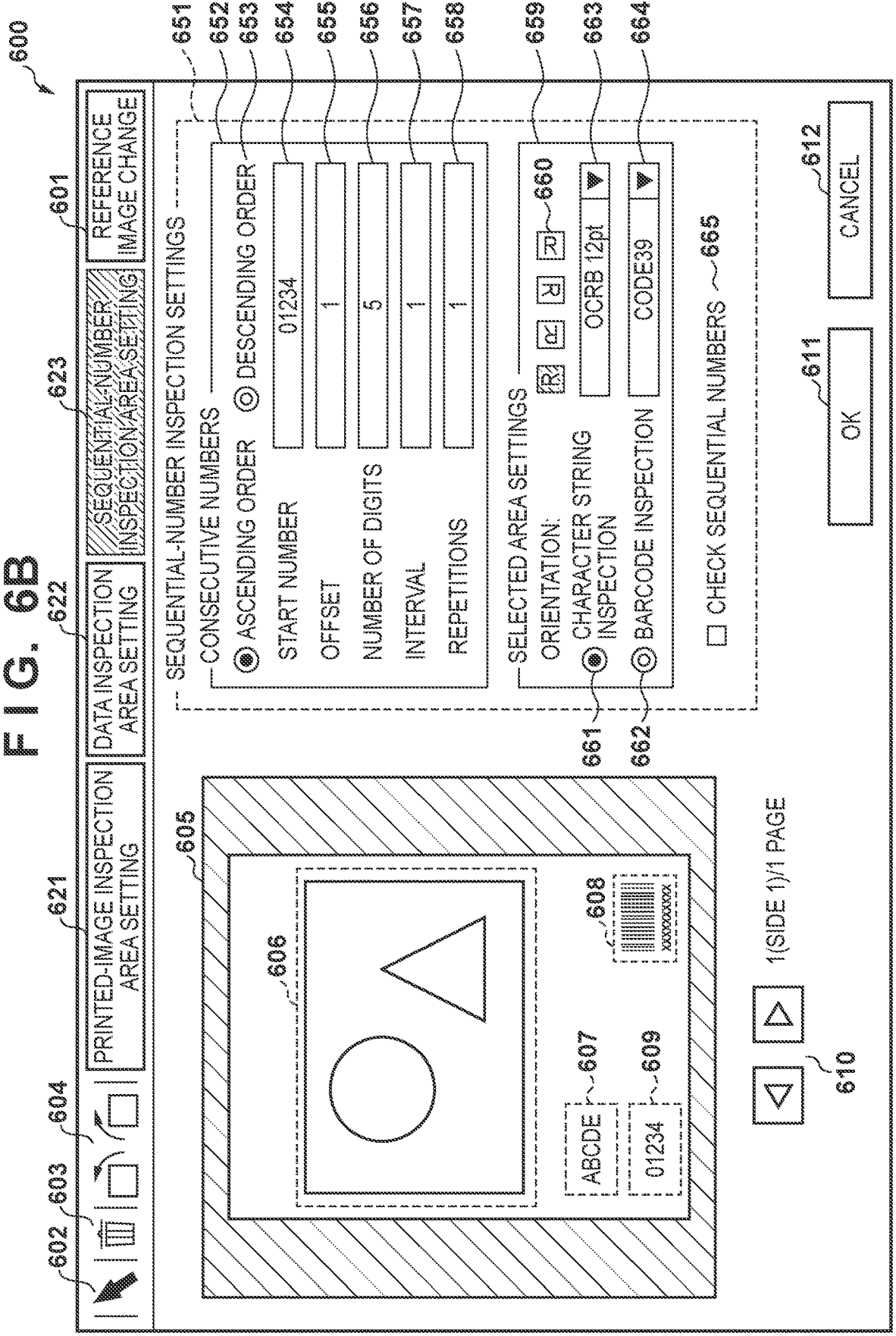

| CONSECUTIVE NUMBERS | |
|---|---|
| ⦿ ASCENDING ORDER  ◎ DESCENDING ORDER | |
| START NUMBER | 001 |
| OFFSET | 3 |
| NUMBER OF DIGITS | 3 |
| INTERVAL | 2 |
| REPETITIONS | 1 |

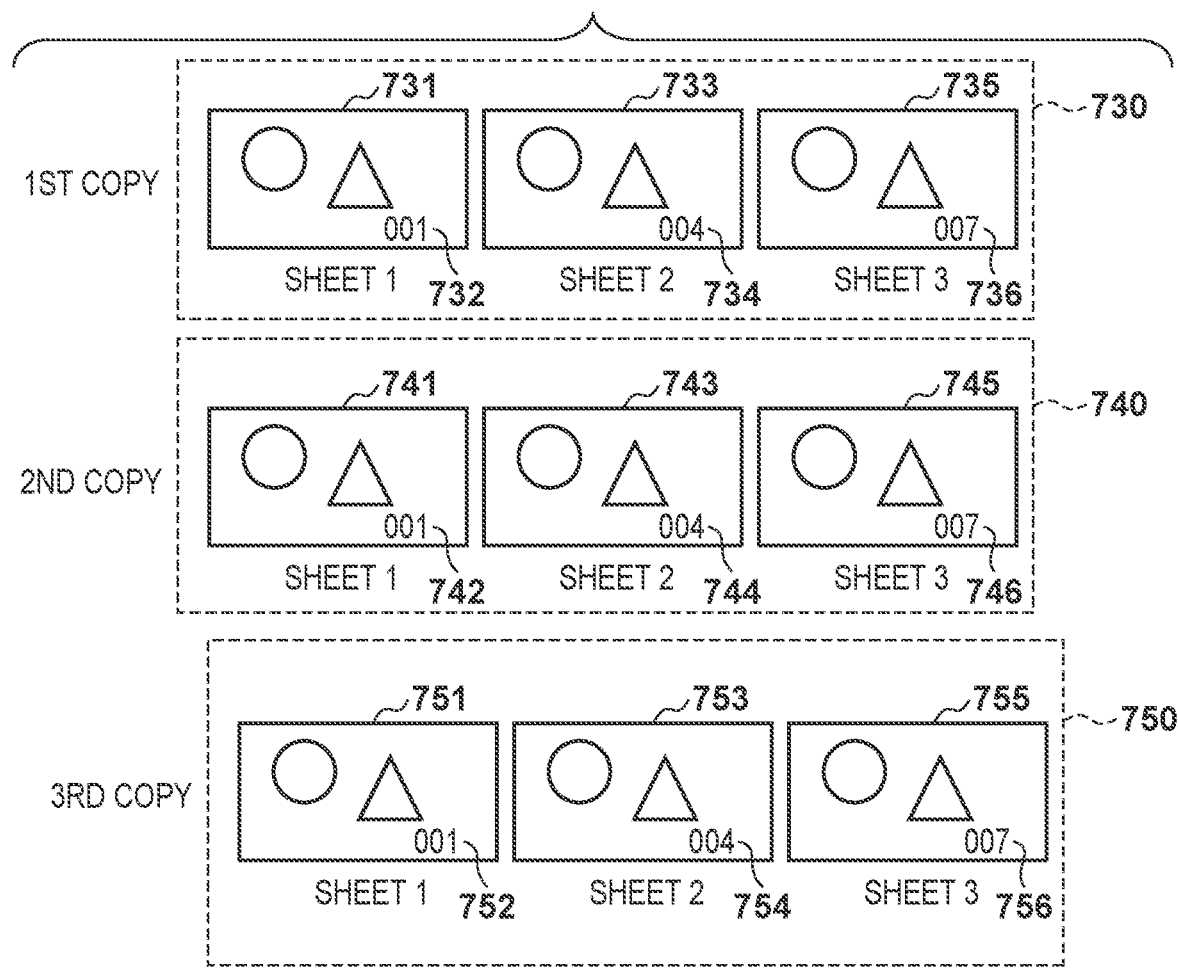

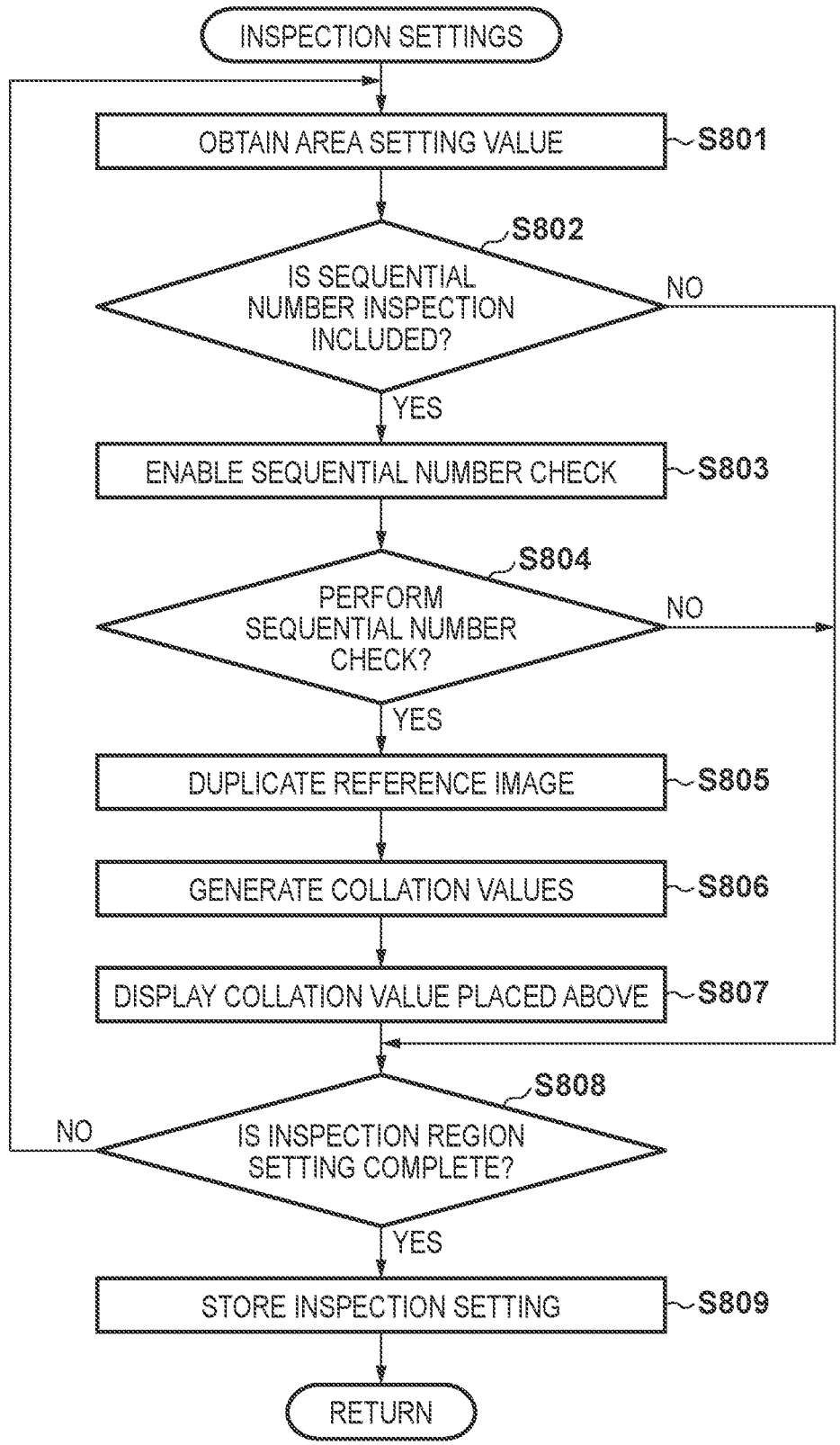

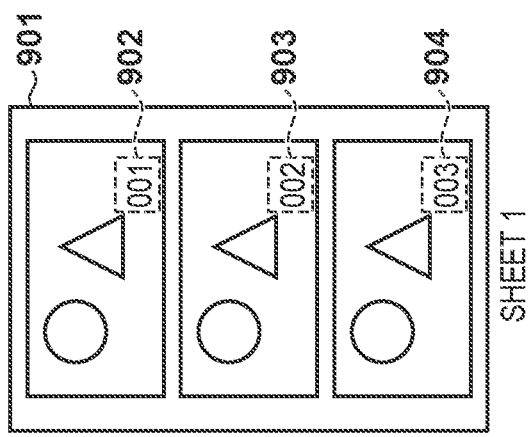
FIG. 9A
DO NOT CONFIRM SEQUENTIAL NUMBER
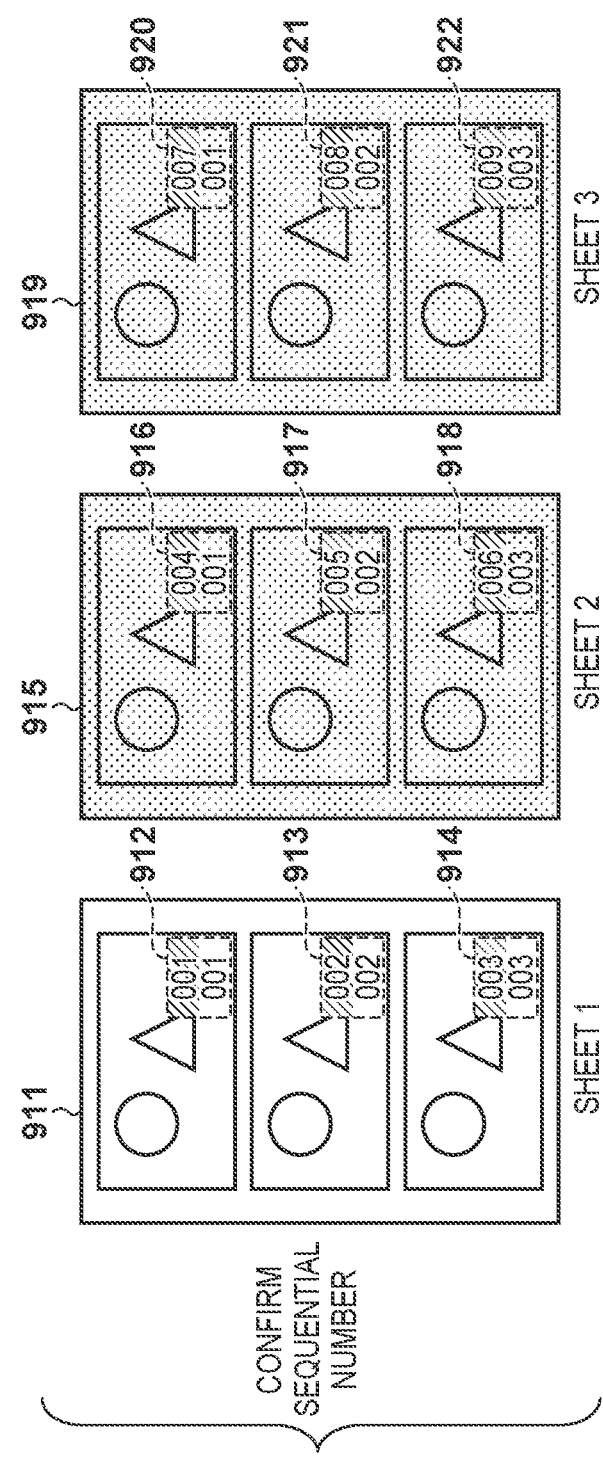
FIG. 9B
CONFIRM SEQUENTIAL NUMBER
FIG. 9C

F I G. 12A

☐ CHECK SEQUENTIAL NUMBER

| SHEET | SIDE | AREA | AREA No | COLLATION VALUE |
|---|---|---|---|---|
| 1 | FRONT | SEQUENTIAL-NUMBER INSPECTION | 1 | 001 |
| 1 | FRONT | SEQUENTIAL-NUMBER INSPECTION | 2 | 002 |
| 1 | FRONT | SEQUENTIAL-NUMBER INSPECTION | 3 | 003 |

☑ CHECK SEQUENTIAL NUMBER — 1201

| SHEET | SIDE | AREA | AREA No | COLLATION VALUE |
|---|---|---|---|---|
| 1 | FRONT | SEQUENTIAL-NUMBER INSPECTION | 1 | 001 |
| 1 | FRONT | SEQUENTIAL-NUMBER INSPECTION | 2 | 002 |
| 1 | FRONT | SEQUENTIAL-NUMBER INSPECTION | 3 | 003 |
| 2 | FRONT | SEQUENTIAL-NUMBER INSPECTION | 1 | 004 |
| 2 | FRONT | SEQUENTIAL-NUMBER INSPECTION | 2 | 005 |
| 2 | FRONT | SEQUENTIAL-NUMBER INSPECTION | 3 | 006 |
| 3 | FRONT | SEQUENTIAL-NUMBER INSPECTION | 1 | 007 |
| 3 | FRONT | SEQUENTIAL-NUMBER INSPECTION | 2 | 008 |
| 3 | FRONT | SEQUENTIAL-NUMBER INSPECTION | 3 | 009 |

1211, 1212, 1213, 1214, 1215, 1216, 1217, 1218, 1219

1200, 1202

OK

INSPECTION SYSTEM, INSPECTION APPARATUS AND METHOD OF CONTROLLING THE SAME, AND STORAGE MEDIUM

BACKGROUND OF THE INVENTION

Field of the Invention

The present invention relates to an inspection system, an inspection apparatus and a method of controlling the same, and a storage medium.

Description of the Related Art

Conventionally, inspection (product inspection) for checking whether printed matters have been printed correctly has been carried out manually; however, in recent years, inspection apparatuses that automatically perform product inspection as post-processing in printers are being used. In such an inspection apparatus, a correct image is registered in advance as a reference image. Subsequently, received image data is printed on paper and output as a printed matter by means of an image forming apparatus, and an image printed on the printed matter is optically read using a sensor of the inspection apparatus. Then, defects in the printed matter are detected by comparing the registered reference image and scanned image data obtained by performing reading using the sensor. In the following, inspection for detecting defects in picture/pattern portions of printed matters will be referred to as printed-image inspection.

Furthermore, in addition to printed-image inspection, inspection of whether variable-data areas (variable data) such as character strings and barcodes have been printed correctly in variable printing is also performed.

Japanese Patent Laid-Open No. 2021-31089 discloses an enclosing-and-sealing machine that performs inspection of addresses by reading barcodes printed on inspection target images and collating sequential numbers that have been read and sequential numbers that are registered in a control file. Furthermore, Japanese Patent Laid-Open No. 2021-31089 also discloses that the order of inspection target images is also inspected by inspecting the continuity of the numbers include in the barcodes.

However, while continuity can be inspected based on sequential numbers according to the method disclosed in Japanese Patent Laid-Open No. 2021-31089, there is no way of confirming whether the sequential-number values are correct, prior to actual inspection. Thus, there is a problem that inspection setting errors readily occur when complicated sequential numbers, such as page numbers for bookbinding printing and multi-imposition printing of tickets, etc., are to be inspected, for example.

SUMMARY OF THE INVENTION

Embodiments of the present disclosure eliminate the above-mentioned issues with conventional technology.

A feature of embodiments of the present disclosure is to provide a technique of confirming collation values that are to be collated with variable data included in images to be inspected, prior to the inspection of the images.

According to embodiments of the present disclosure, there is provided an inspection system comprising: an image forming apparatus; and an inspection apparatus, wherein the inspection apparatus comprising: a controller including one or more processors and one or more memories, the controller configured to: obtain a scanned image by reading a printed matter printed by the image forming apparatus; set an inspection target area in which inspection is to be performed on data of a variable-data area included in the scanned image; set an inspection item for the inspection target area; generate, in accordance with the inspection item, a collation value to which the inspection item is to be applied, in a reference image; perform inspection by comparing the reference image including the collation value and a scanned image of an inspection-target printed matter; and perform control so that the generated collation value is able to be confirmed prior to the inspection.

According to embodiments of the present disclosure, there is provided an inspection apparatus that inspects printed matters, comprising a controller including one or more processors and one or more memories, the controller configured to: obtain a scanned image by reading a printed matter; set an inspection target area in which inspection is to be performed on data of a variable-data area included in the scanned image; set an inspection item for the inspection target area; generate, in accordance with the inspection item, a collation value to which the inspection item is to be applied, in a reference image; perform inspection by comparing the reference image including the collation value and a scanned image of an inspection-target printed matter; and perform control so that the generated collation value is able to be confirmed prior to the inspection.

According to embodiments of the present disclosure, there is provided a method of controlling an inspection apparatus that inspects printed matters, the method comprising: obtaining a scanned image by reading a printed matter; setting an inspection target area in which inspection is to be performed on data of a variable-data area included in the scanned image; setting an inspection item for the inspection target area; generating, in accordance with the inspection item, a collation value to which the inspection item is to be applied, in a reference image; performing inspection by comparing the reference image including the collation value and a scanned image of the inspection-target printed matter; and performing control so that the generated collation value is able to be confirmed prior to the inspection.

Further features of the present disclosure will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the disclosure and, together with the description, serve to explain the principles of the disclosure.

FIG. 5 is a diagram illustrating one example of an inspection-job management screen displayed on a UI unit of the inspection apparatus according to the first embodiment.

FIG. 6B is a diagram illustrating one example of an inspection setting screen displayed on the UI unit of the inspection apparatus in order to set a sequential-number inspection area in the first embodiment.

FIGS. 7A to 7F are diagrams illustrating examples of setting values and inspection job data for sequential-number inspection in the first embodiment.

FIG. 8 is a flowchart for describing inspection setting processing in step S403 of FIG. 4.

FIGS. 9A to 9C are diagrams illustrating examples of sequential-number-inspection-setting checking screens that are displayed in an inspection setting screen in accordance with a "check sequential number" setting item in the inspection apparatus according to the first embodiment.

FIGS. 12A and 12B are diagrams illustrating examples of inspection area lists in the second embodiment in a case in which inspection settings illustrated in FIG. 7B have been set when inspection target images illustrated in FIG. 7A are inspected.

DESCRIPTION OF THE EMBODIMENTS

Embodiments of the present disclosure will be described hereinafter in detail, with reference to the accompanying drawings. It is to be understood that the following embodiments are not intended to limit the claims of the present disclosure, and that not all of the combinations of the aspects that are described according to the following embodiments are necessarily required with respect to the means to solve the issues according to the present disclosure. Note that, in the following description, an image forming apparatus may also be referred to as a multi-function printer or a multi-function peripheral (MFP).

First Embodiment

Figure 1:
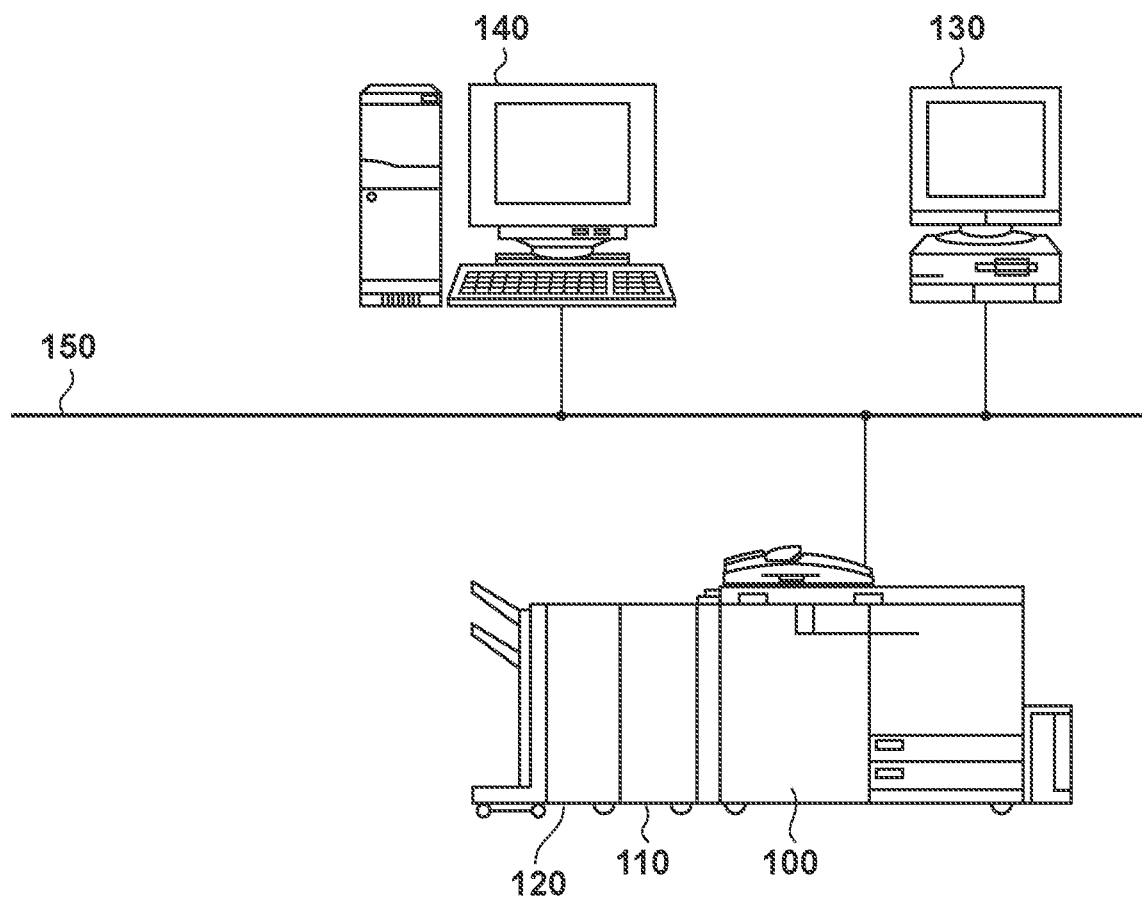
FIG. 1 is a diagram illustrating a configuration of an inspection system including an inspection apparatus, according to a first embodiment of the present invention.

FIG. 1 is a diagram illustrating a configuration of an inspection system including an inspection apparatus, according to a first embodiment of the present invention.

This inspection system includes an image forming apparatus 100, an inspection apparatus 110, a finisher 120, a client PC 130, and a print server 140, and the image forming apparatus 100, the client PC 130, and the print server 140 are connected to one another via a network 150. The image forming apparatus (printing apparatus) 100 performs printing based on various types of input data, examples of which include print data transmitted from the client PC 130 or the print server 140, and outputs printed matters. The inspection apparatus 110 receives printed matters output from the image forming apparatus 100, and inspects the received printed matters for defects. Here, the defects reduce the quality of printed matters, and, for example, are blemishes caused by color material adhering to unintended portions of printed matters, and color loss/decoloration caused by not enough color material adhering to intended portions of printed matters.

Furthermore, when variable printing including variable-data areas (variable data) such as character strings and barcodes is performed, the inspection apparatus 110 inspects the variable-data areas. For example, data readability inspection for checking whether character strings and barcodes can be read, and data collation inspection in which character string- and barcode-reading results are collated with reference images are performed. In the following, data readability inspection and data collation inspection are collectively referred to as data inspection. In the data inspection, a user needs to register a glyph font, which is data in which glyph images of characters and character codes are associated with one another, so that optical character recognition (OCR) can be performed. Note that registration work for creating a glyph font is referred to herein as glyph registration. Furthermore, one type of data inspection is sequential-number inspection. In the sequential-number inspection, inspection is performed of data, such as IDs, page numbers, and dates, having consecutive numerical values in and between pages of inspection-target images. That is, the inspection apparatus 110 performs printed-image inspection for detecting defects in picture/pattern portions of printed matters, and data inspection including data readability inspection and data collation inspection. Note that, in the first embodiment, description will be provided while taking, as an example of data collation inspection, sequential-number inspection, in which numerical values in a data area are data set based on predetermined rules. However, this is not intended to limit the present invention, and data collation inspection may be performed with respect to any data set based on predetermined rules. Other examples will be described in detail in the later-described modifications.

The finisher 120 receives papers (printed matters) inspected by the inspection apparatus 110, and discharges papers while switching the paper-discharge destination based on the results of the inspection by the inspection apparatus 110 and executing post-processing (book-binding, stapling, etc.) as necessary.

The image forming apparatus 100 is connected to the client PC 130 and the print server 140 via the network 150, and is further connected to the inspection apparatus 110 and the finisher 120 via communication cables. Furthermore, the inspection apparatus 110 is also connected to the finisher 120 via a communication cable, in addition to being connected to the image forming apparatus 100. In the first embodiment, description will be provided with reference to an inline inspection machine that integrally performs image forming, product inspection (inspection), post-processing, and sheet discharge; however, this is not intended to limit the present invention.

Figure 2:
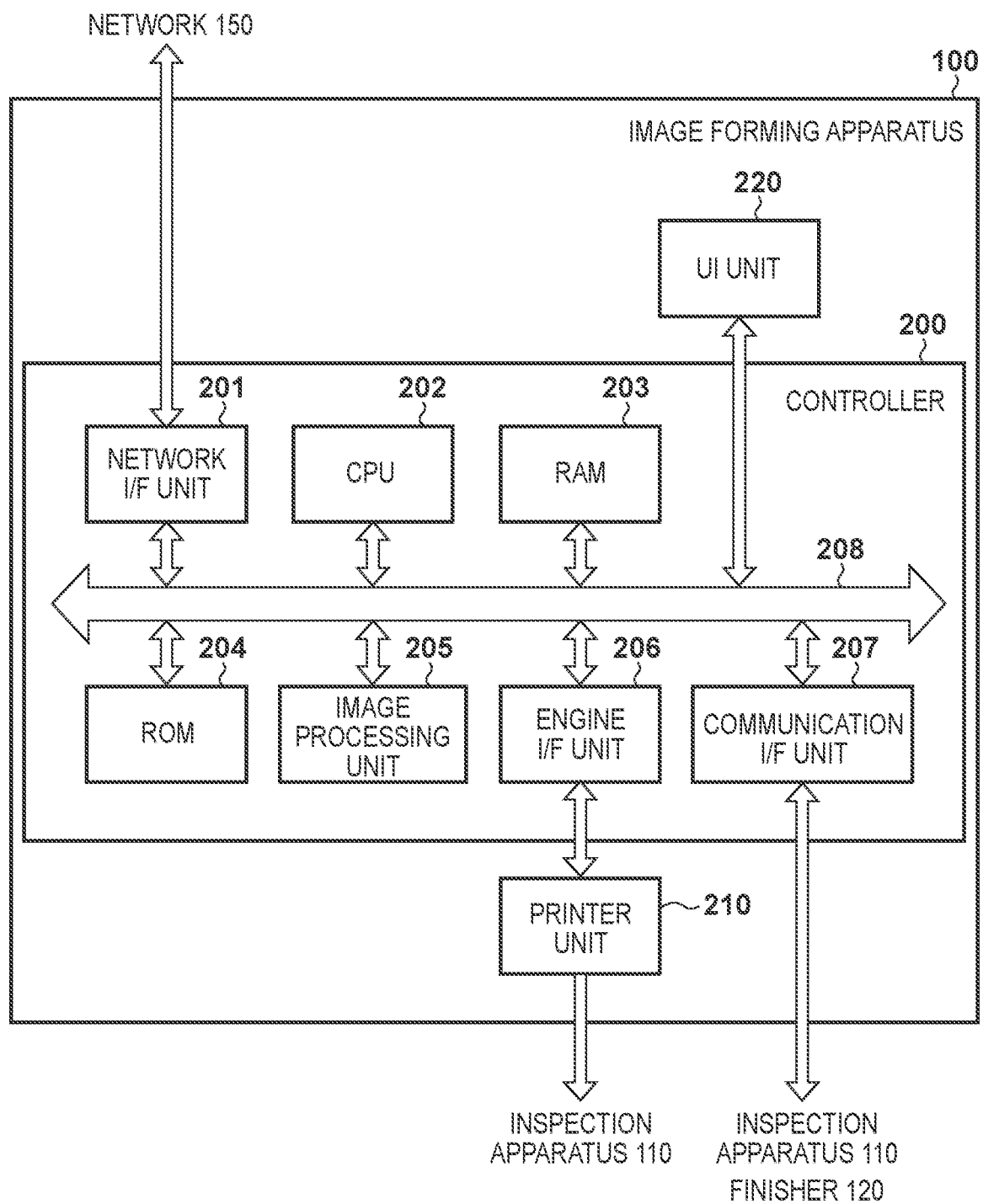
FIG. 2 is a block diagram for describing an internal configuration of an image forming apparatus according to the first embodiment.

FIG. 2 is a block diagram or describing a configuration of the image forming apparatus 100 according to the first embodiment.

A controller 200 receives images and documents from the network 150, and converts the received images and documents into print data. A printer unit 210 prints print data onto a recording medium (paper, sheet, or the like). A user interface (UI) unit 220 displays screens and receives instructions, such as a selection of paper information, issued to the image forming apparatus 100 from a user.

Next, a configuration of the controller 200 will be described.

A network interface (I/F) unit 201 transmits and receives data to and from the client PC 130 and the print server 140 via the network 150. A CPU 202 controls the entire image forming apparatus 100. A RAM 203 functions as a work area and a program deploying area when the CPU 202 executes various commands. A ROM 204 stores program data that the CPU 202 executes upon activation, setting data of the controller 200, etc. An image processing unit 205 performs raster image processing (RIP) for converting image and document data received from the network 150 into print data. An engine interface (I/F) unit 206 transmits print data to the printer unit 210 and causes the printer unit 210 to print the print data. A communication I/F unit 207 communicates with the inspection apparatus 110 and the finisher 120. The CPU 202 executes programs deployed in the RAM 203 from the ROM 204, and controls units of the controller 200 via an internal bus (system bus) 208.

An image or document created on the client PC 130 or print server 140 on the network 150 is transmitted to the image forming apparatus 100 via the network (for example, a local area network (LAN)) as PDL data. The transmitted PDL data is stored in the RAM 203 via the network I/F unit 201. Furthermore, a print instruction issued by the user via the UI unit 220 is also stored in the RAM 203 via the internal bus 208. For example, the print instruction issued by the user includes a selection of paper type, etc.

The image processing unit 205 obtains the PDL data stored in the RAM 203 and performs image processing for converting the PDL data into print data. For example, the image processing for conversion into print data involves rasterizing the PDL data to convert the PDL data into multivalued bitmap data, and converting the multivalued bitmap data into binary bitmap data by performing screen processing or the like. The binary bitmap data obtained by the image processing unit 205 is transmitted to the printer unit 210 via the engine I/F unit 206 to be printed.

The printer unit 210 prints the received binary bitmap data onto a sheet using coloring materials. The CPU 202 issues an instruction to the printer unit 210 based on the user print instruction stored in the RAM 203. For example, if an instruction to print on coated paper has been issued by the user, the CPU 202 issues an instruction to the printer unit 210 to feed coated paper from an unillustrated paper cassette inside the image forming apparatus 100 in which coated paper is stored. A full-color toner image is formed (printed) on a sheet by the various types of processing described above from the reception of PDL data to the printing onto a sheet being controlled by the CPU 202.

Figure 3:
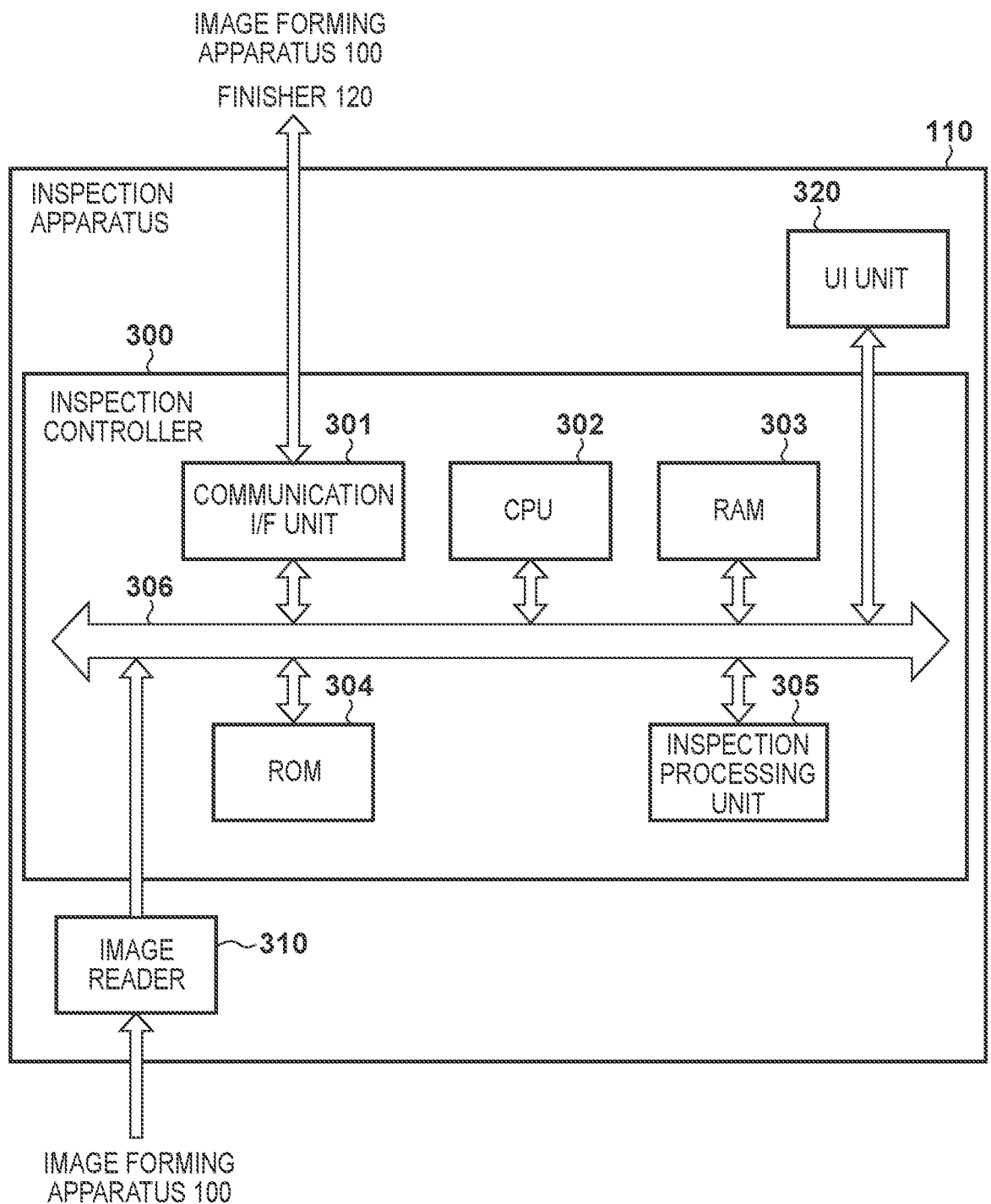
FIG. 3 is a block diagram for describing an internal configuration of the inspection apparatus according to the first embodiment.

FIG. 3 is a block diagram for describing a configuration of the inspection apparatus 110 according to the first embodiment.

An inspection controller 300 controls the entire inspection apparatus 110 and inspects printed matters for defects. An image reader 310 reads printed matters conveyed from the image forming apparatus 100. In the image reader 310, scanned images are generated by reading printed matters. A UI unit 320 includes an operation unit including hardware keys and a display unit (touch panel) used by the user to set settings of the inspection apparatus 110 and used to display inspection results, etc., to the user. Note that the settings of the inspection apparatus 110 set by the user here include items such as the types of defects to be inspected when printed matters are inspected. For example, inspection items relating to defects are circular defects (spots) and linear defects (streaks). Note that, in the first embodiment, the UI unit 320 includes a display unit that displays screens and a display control unit that controls the screens displayed on the display unit.

Next, a configuration of the inspection controller 300 will be described.

A communication interface (I/F) 301 transmits and receives data to and from the image forming apparatus 100 and the finisher 120. A CPU 302 executes programs deployed in a RAM 303 and controls the entire inspection apparatus 110. The RAM 303 provides the CPU 302 with a program area and a work area for executing various types of commands. A ROM 304 stores program data that the CPU 302 executes upon activation, setting data of the inspection controller 300, etc. An inspection processing unit 305 inspects printed matters for defects. An internal bus 306 is a system bus connecting the CPU 302 and the above-described units.

Next, an overview of the printed-image inspection performed by the inspection apparatus 110 according to the first embodiment will be described.

The inspection apparatus 110, by means of the image reader 310, reads a printed matter conveyed from the image forming apparatus 100 and obtains an inspection-target scanned image. The obtained inspection-target scanned image is stored to the RAM 303. Subsequently, the inspection apparatus 110, by means of the inspection processing unit 305, obtains difference values between the inspection-target scanned image and the reference image stored in advance in the RAM 303 as a correct image. Furthermore, the inspection apparatus 110 performs inspection by comparing, pixel by pixel, the obtained difference values and inspection thresholds (contrast, size, etc.) of individual inspection items. The results of this inspection are stored in the RAM 303; for example, information indicating whether or not there are defects in the printed matter, the types of detected defects (spots and streaks), position information of the defects upon display on the UI unit 320, etc., are stored.

Next, an overview of the data inspection performed by the inspection apparatus 110 according to the first embodiment will be described.

The inspection apparatus 110, by means of the image reader 310, reads a printed matter conveyed from the image forming apparatus 100 and obtains an inspection-target scanned image. The obtained inspection-target scanned image is stored to the RAM 303. Subsequently, the inspection apparatus 110, by means of the inspection processing unit 305, inspects whether character strings and barcodes can be read using barcode specifications and a glyph font for OCR processing set in advance. Furthermore, the inspection apparatus 110 may also perform data collation inspection in which a collation is performed as to whether the character string- and barcode-reading results and the contents of the reference image (correct image) match. The results of the inspection are stored in the RAM 303; for example, the character string- and barcode-reading results from the printed matter, the results of the collation with the reference image, position information of the read characters and barcodes upon display on the UI unit 320, etc., are stored. The CPU 302 instructs the UI unit 320 to display the inspection results stored in the RAM 303. As a result of the inspection results being displayed on the UI unit 320 in such a manner, the user can recognize the inspection results.

Furthermore, if a certain quantity of printed matters with defects are continuously produced, the inspection apparatus 110, by means of the CPU 302, transmits information indicating that printed matters with defects have been continuously produced to the image forming apparatus 100 via the communication I/F unit 301. This information is received by the controller 200 of the image forming apparatus 100 via the communication I/F unit 207 of the image forming apparatus 100. When the controller 200 receives this information, the CPU 202 of the image forming apparatus 100 instructs the printer unit 210 to stop printing. As a result of the image forming apparatus 100 stopping the printing operation by instructing the printer unit 210 to stop printing in such a manner, the image forming apparatus 100 can prevent any more useless printed matters from being formed.

Furthermore, based on the inspection results stored in the RAM 303, the inspection apparatus 110, by means of the CPU 302, also transmits information to the finisher 120 via the communication I/F unit 301. The information transmitted to the finisher 120 here is information indicating whether or not there are a defect in a printed matter. Using the received information, the finisher 120 discharges a printed matter without defect to a regular paper-discharge tray and discharges a printed matter with defect to a tray that is different from the regular paper-discharge tray. Thus, the printed matter without defect and the printed matters with defect can be prevented from being mixed with one another.

Figure 4:
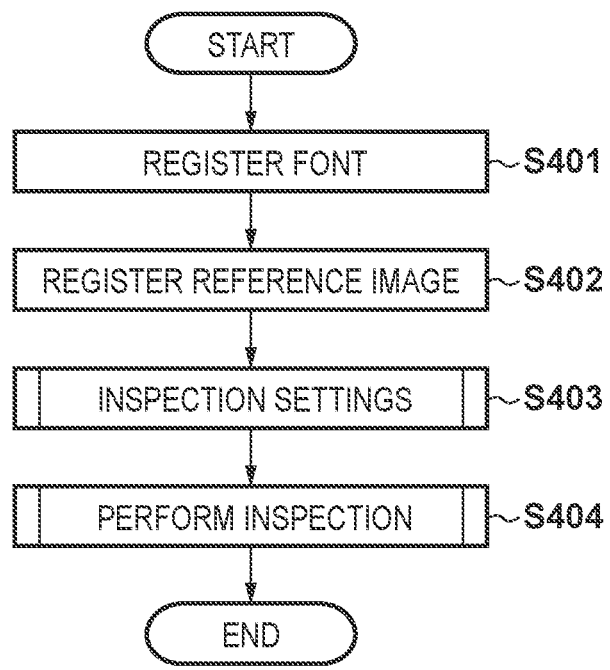
FIG. 4 is a flowchart for describing an overall flow from registration work performed by the inspection apparatus according to the first embodiment before inspection is started to the execution of inspection by the inspection apparatus.

FIG. 4 is a flowchart for describing an overall flow from registration work performed by the inspection apparatus 110 according to the first embodiment before inspection is started to the execution of inspection by the inspection apparatus 110. The processing described in this flowchart is realized by the CPU 302 of the inspection apparatus 110 deploying program code stored in the ROM 304 to the RAM 303 and executing the program code.

First, in step S401, the CPU 302 registers a glyph font. The glyph font registered here is used for the data inspection. A glyph font is data in which glyph images of characters and character codes are associated with one another, and which is necessary for OCR processing performed in the data inspection. In the procedure for creating a glyph font, first, the inspection apparatus 110 waits in a glyph-font-image reading mode to receive a print job for creating a glyph font from the client PC 130. The inspection apparatus 110 receives a print job for creating a glyph font from the client PC 130. Then, printing is executed by the image forming apparatus 100 in accordance with the print job. Upon sensing the conveyance of a printed matter printed by the image forming apparatus 100 in accordance with the print job, the inspection apparatus 110 scans the printed matter by means of the image reader 310 and stores the scanned image to the RAM 303 of the inspection apparatus 110. Then, the inspection apparatus 110 creates a glyph font by cutting out characters to be OCR processed one by one from the scanned image and having the user input character codes corresponding to the cut-out character images. The glyph font created in such a manner is stored in the RAM 303 of the inspection apparatus 110. Note that, while a glyph font creation method according to the first embodiment has been described here, the present invention is not limited to this; any method may be adopted as long as data in which character codes are associated with character images cut out from a scanned image can be created. Note that there may also be cases in which only the printed-image inspection is performed, without the data inspection being performed. In such cases, processing transitions to step S402 without the font registration in step S401 being executed.

In step S402, the CPU 302 registers a reference image that serves as a correct image in inspection. Here, the inspection apparatus 110 waits in a reference-image reading mode, and a print job for registering a reference image is executed from the client PC 130. When printing is executed, the inspection apparatus 110 senses the conveyance of a printed matter and scans the printed matter by means of the image reader 310, and the scanned image is stored in the RAM 303 of the inspection apparatus 110 as a reference image. Here, description is provided taking as an example scan inspection, in which scanned images are registered as reference images.

Next, advancing to step S403, the CPU 302, in accordance with inspection settings set by the user, stores various types of setting values for inspection, such as inspection areas and inspection levels, in the RAM 303 of the inspection apparatus 110. Note that this step S403 will be described in detail later. Next, advancing to step S404, upon receiving a print job for inspection from the client PC 130, the CPU 302 senses the conveyance of a printed matter printed by the image forming apparatus 100, scans the printed matter by means of the image reader 310, and stores the scanned image in the RAM 303 of the inspection apparatus 110. Furthermore, the CPU 302 inspects the printed matter by comparing the scanned image obtained by scanning the printed matter printed in the print job for inspection and the reference image registered in step S402 based on the inspection setting values set in step S403, and terminates the processing. Note that this step S404 will be described in detail later.

FIG. 5 is a diagram illustrating one example of an inspection-job management screen 500 displayed on the UI unit 320 of the inspection apparatus 110 according to the first embodiment.

The job management screen 500 is displayed when the inspection apparatus 110 is activated. Otherwise, the job management screen 500 is displayed when an application is activated by a user operation performed via the UI unit 320. It is possible to transition to the font registration, reference image registration, inspection setting, and inspection processings from this job management screen 500.

A button 501 is a button for deleting (closing) the display of this screen 500. A "new" button 502 is a button for newly creating an inspection job, and triggers an instruction to register a reference image here. A "duplication" button 503 is a button for duplicating an inspection job that has already been created. When the "duplication" button 503 is pressed, the inspection job selected in an inspection job list 508 is duplicated. By duplicating an inspection job, an inspection job for performing inspection can be newly created while duplicating a reference image and inspection settings. A transition to the inspection setting screens illustrated in FIGS. 6A and 6B is triggered when the "duplication" button 503 is pressed.

A "delete" button 504 is for deleting the inspection job selected in the inspection job list 508. Here, it is also possible to delete a plurality of inspection jobs at once by selecting a plurality of inspection jobs and pressing the "delete" button 504. An "inspection setting" button 505 is for setting inspection settings of an inspection job for which a reference image has been registered. An "inspection" button 506 is for providing an instruction to perform inspection of an inspection job for which a reference image has been registered and inspection settings have been set.

Next, inspection settings will be described with reference to FIGS. 6A and 6B.

Figure 6A:
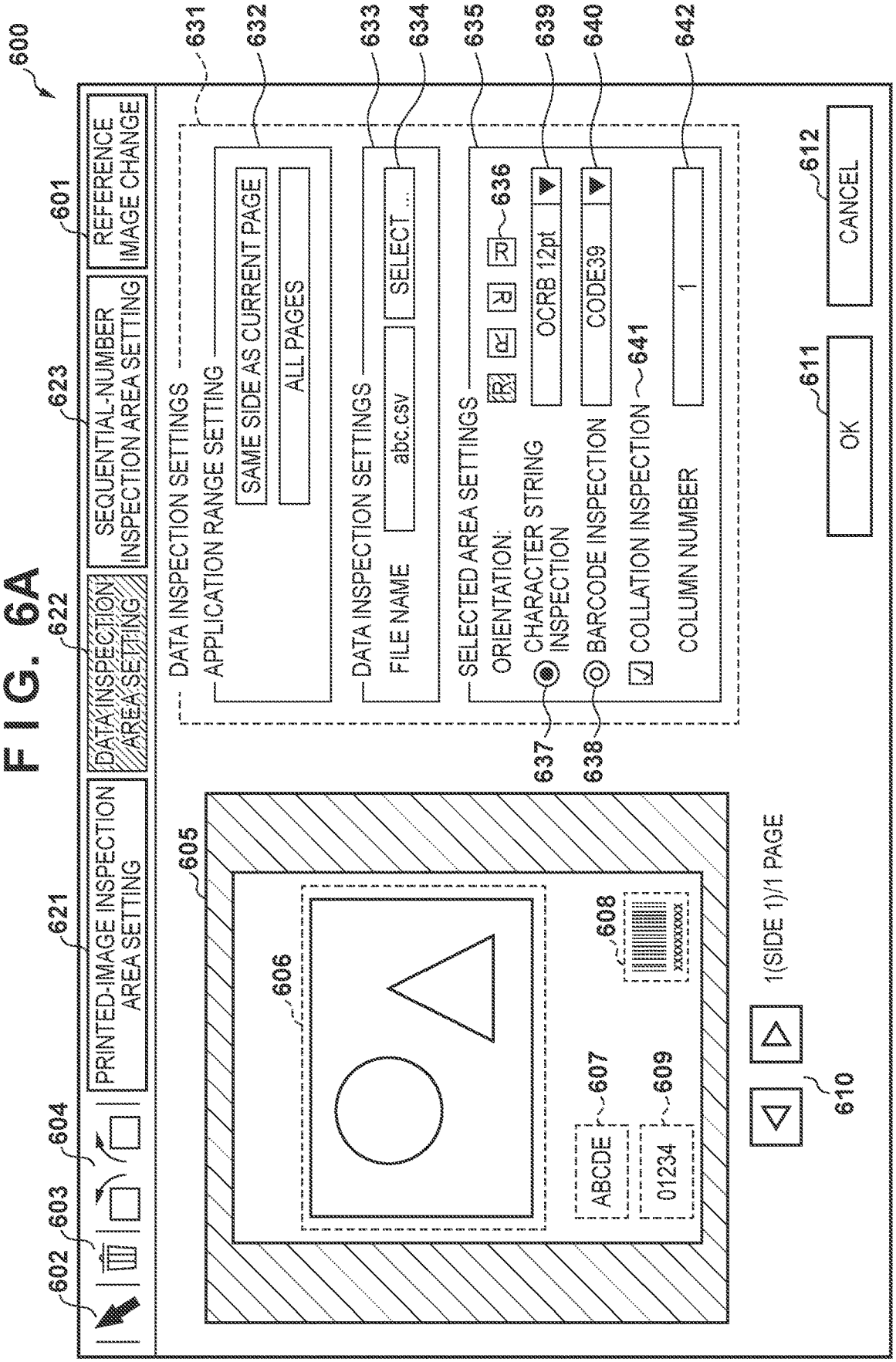
FIG. 6A is a diagram illustrating one example of an inspection setting screen displayed on the UI unit of the inspection apparatus in order to set inspection settings of an inspection job in the first embodiment.

FIG. 6A is a diagram illustrating one example of an inspection setting screen 600 displayed on the UI unit 320 of the inspection apparatus 110 in order to set inspection settings of an inspection job in the first embodiment. FIG. 6A illustrates a state in which a "data inspection area setting" button 622 has been selected.

A "reference image change" button 601 is a button for providing an instruction to change the reference image. An inspection area selection button 602 is pressed by an operator if the operator would like to select an inspection area that has already been set. A delete button 603 is a button for deleting an inspection area, and is pressed by the operator if the operator would like to delete the currently selected area. Rotation buttons 604 are for rotating the image displayed in an area 605. The area 605 is a display area for displaying a loaded reference image. If a plurality of sheets that respectively print reference images are loaded, the displayed image is switched to the previous page or the next page using buttons 610. Furthermore, it is possible to switch between the front and back sides of a loaded sheet using the buttons 610. An "OK" button 611 is for storing the settings in the screen 600 and triggering a transition to the job management screen 500 illustrated in FIG. 5. Furthermore, a configuration may be adopted such that a transition to an unillustrated inspection screen is triggered and inspection can be executed when the "OK" button 611 is pressed. A "cancel" button 612 is a cancel button for triggering a transition to the job management screen 500 illustrated in FIG. 5 without storing the settings in the screen 600.

A "printed-image inspection area setting" button 621 is pressed to newly set a printed-image inspection area. After pressing this button 621, the operator sets an inspection area to be subjected to the printed-image inspection in the reference image displayed in the area 605. An area 606 indicates an example of a printed-image inspection area that has been set by the operator.

A "data inspection area setting" button 622 is pressed to newly set an area to be subjected to character inspection or barcode inspection. In FIG. 6A, a state in which this button 622 has been selected is illustrated. After pressing this button 622, the operator sets an inspection area to be subjected to the data inspection in the reference image, for example, as an area 607 and an area 608 displayed in the area 605. The area 607 indicates an example of a character inspection area that has been set by the operator. Also, the area 608 indicates an example of a barcode inspection area that has been set by the operator.

A "sequential-number inspection area setting" button 623 is pressed to newly set a sequential-number inspection area. After pressing this button 623, the operator sets an inspection area to be subjected to sequential-number inspection, for example, as an area 609, in the reference image displayed in the area 605. The area 609 indicates an example of a sequential-number inspection area that has been set by the operator.

"Data inspection settings" 631 indicate a group of UIs that are for performing settings of the displayed data inspection area in a case in which a data inspection area is currently selected in the area 605. Here, the character area 607 is the currently selected area. An "application range setting" area 632 is for setting an application range of the currently selected area. If no selection is made, the selected inspection area is arranged only in the page currently displayed in the area 605. If "same side as current page" is selected, the currently selected inspection area is arranged in pages on the same side in accordance with whether the currently selected inspection area is arranged on the front side or the rear side of a sheet. If "all pages" is selected, the currently selected inspection area is arranged in all pages.

A "collation inspection data" setting area 633 is an area for setting a correct CSV file to be used for collation during collation inspection. A file is selected by pressing a button 634, and the name of the selected file is displayed. The same correct CSV file is specified for both character inspection and barcode inspection.

A setting area 635 is for performing settings of the currently selected data inspection area. Here, the following is specified: an orientation; selection of whether the area is a character area or a barcode area; font type; barcode type; execution or non-execution of collation inspection; and a column in the correct CSV file to be used during collation inspection. A setting item 636 is for setting the orientation of characters in the character area 607. Setting items 637 and 638 are for specifying whether the currently selected area is for character string inspection or barcode inspection. A setting item 639 is for setting a font to be used to perform OCR processing on the character area 607. A setting item 640 is for setting a barcode type in a case in which barcode inspection is selected using setting item 638. A setting item 641 is for setting execution or non-execution of collation inspection. If execution of collation inspection is set, using the correct CSV file specified in the setting area 633 and the column number specified in a setting item 642, the character area 607 is subjected to OCR processing and collation inspection is performed between the read character string and the character string specified in the correct CSV.

FIG. 6B is a diagram illustrating one example of an inspection setting screen in a case in which the "sequential-number inspection area setting" button 623 is selected and the currently selected setting area is a sequential-number inspection area. Note that, in FIG. 6B, portions that are the same as those in FIG. 6A are denoted using the same reference numerals, and description thereof will be omitted. In FIG. 6B, the sequential-number inspection area 609 in the area 605 is the currently selected area.

A "sequential-number inspection setting" area 651 shows a group of UIs that are for setting settings of the displayed sequential-number inspection area in a case in which the sequential-number inspection area 609 is currently selected in the area 605. In setting area 652, settings of the currently selected sequential-number inspection area are set. Here, sequential-number rules are set. The sequential-number rules include specifications of a starting number, an offset, a number of digits, an interval, and repetition. A setting item 653 is an item for selecting whether sequential-number values increase or decrease; the values increase if "ascending order" is selected and decrease if "descending order". A setting item 654 is an item for setting the starting number of sequential numbers. A setting item 655 is an item for setting the value of increase/decrease in sequential numbers in the sequential-number inspection area between sheets. This value is called an offset in the first embodiment. A setting item 656 is an item for setting the number of digits in sequential numbers. In a case in which a sequential number includes the five digits "01234" as in the sequential-number inspection area 609, "5" is specified. Furthermore, the number of digits in the numerical value in the inspection target area need not be set as-is, and, in a case in which it is desired to inspect only three digits even though the numerical value in the inspection target area includes five digits, it is sufficient that "3" be set, for example. A setting item 657 is an item for setting the number of sheets per which values are to be increased/decreased by the offset. For example, if "2" is set as the interval, values increases by the offset once every two sheets. A setting item 658 is for setting a count indicating the number of times the sequential numbers created by setting the setting items 653, 654, 655, 656, and 657 are to be repeated.

Setting items 660 to 664 included in a "selected area settings" area 659 are the same as setting items 636 to 640 illustrated in FIG. 6A, and description thereof is thus omitted. A setting item 665 is for setting whether to check collation values generated based on the sequential-number rules set in the "sequential-number numbers" setting area 652. Here, if this checkbox is checked, operation is performed so as to check the collation values. These setting items will be described in detail later.

Next, example settings of the sequential-number inspection will be described with reference to FIGS. 7A to 7F. Here, an assumption is made that scan inspection is performed, and, in the sequential-number inspection, only one image is scanned and the scanned image is registered as a reference image if images are the same other except for the sequential number areas.

Figures 7A, 7B:
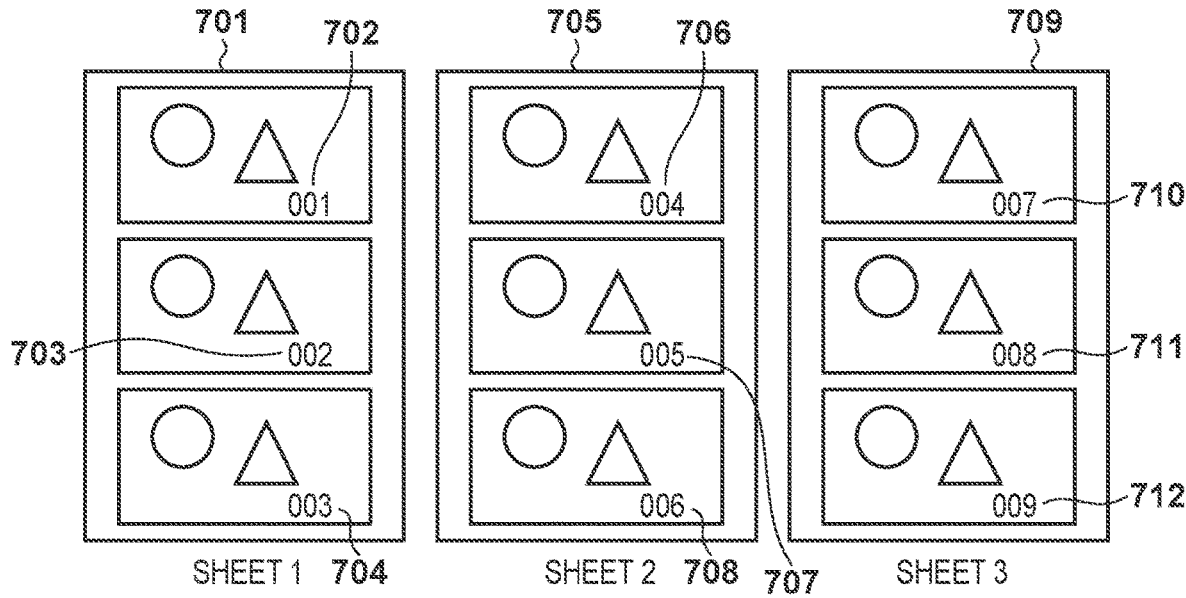

FIG. 7A illustrates one example of inspection-target images; images 701, 705, and 709 correspond to sheets 1, 2, and 3, respectively, and the images are read and inspected in order from sheet 1. Note that, here, the image 701 on the sheet 1 is registered as a reference image.

Reference numerals 702 to 704, 706 to 708, and 710 to 712 respectively indicate sequential numbers printed on the images 701, 705, and 709. Here, the user sets a sequential-number inspection area with respect to each of the sequential numbers 702, 703, and 704.

FIG. 7B illustrates example sequential-number settings in a case in which an area of the sequential number 702 has been set as a sequential-number inspection area. Because the starting number of the sequential number 702 is "001", "001" is set as the starting number. Because the sequential number 702 corresponds to "004" in the sequential number 706 on sheet 2 and "007" in the sequential number 710 on sheet 3 and thus the sequential numbers increase in increments of 3, "3" is set as the offset indicating the value of increase/decrease. Furthermore, "3" is set as the number of digits because the sequential numbers 702, 706, and 710 include three digits. Because the same value does not continue in the inspection images 701, 705, and 709, "1" is set as the interval. Furthermore, because the sequential numbers are not repeated either, "1" is set as the repetition.

Figures 7C, 7D:
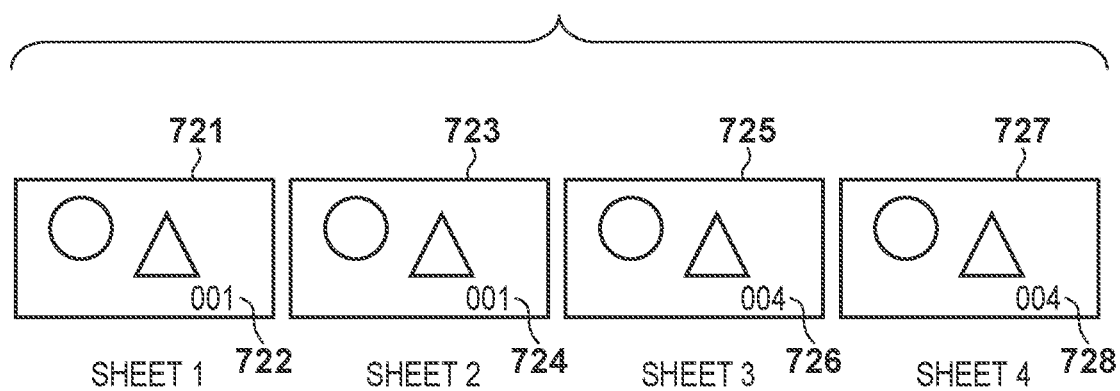

FIG. 7C is a diagram illustrating one example of inspection images in a case which the same sequential-number value is continuously printed. Note that, here, an image 721 on a sheet 1 is a reference image.

Images 721, 723, 725, and 727 correspond to sheets 1, 2, 3, and 4, respectively, and the images are read and inspected in order from the sheet 1. Reference numerals 722, 724, 726, and 728 respectively indicate the sequential numbers printed on the images 721, 723, 725, and 727. Here, the user sets a sequential-number inspection area with respect to the sequential number 722.

FIG. 7D illustrates example settings in a case in which the area of the sequential number 722 has been set as a sequential-number inspection area.

Because the starting number of the sequential number 722 is "001", "001" is set as the starting number. Because the sequential number 722 corresponds to "001" in the sequential number 724 on the sheet 2, "004" in the sequential number 726 on the sheet 3, and "004" in the sequential number 728 on the sheet 4, the sequential numbers increase in increments of 3 every two sheets. Thus, because the value of increase is "3" each time, "3" is set as the offset indicating the value of increase/decrease. Furthermore, "3" is set as the number of digits because the sequential numbers 722, 724, 726, and 728 include three digits. Furthermore, because the numerical values increase every two sheets in the inspection images in FIG. 7C, "2" is set as the interval, which is the number of sheets in which the same value continues. Furthermore, because the sequential numbers are not repeated, "1" is set as the repetition.

FIG. 7E is a diagram illustrating one example of inspection images in a case in which sequential numbers are repeated over multiple copies.

Images 731, 733, and 735 correspond to sheets 1, 2, and 3, respectively, and the images are read and inspected in order from the sheet 1. Note that, here, the image 731 on the sheet 1 is a reference image. One copy 730 is formed by the images 731, 733, and 735, and the same images as those in the copy 730 are repeatedly printed in each of a second copy 740 and a third copy 750. Images 741, 743, and 745 correspond to sheets 1, 2, and 3 in the second copy 740, and images 751, 753, and 755 correspond to sheets 1, 2, and 3 in the third copy 750. Reference numerals 732, 734, and 736 respectively indicate the sequential numbers printed on the images 731, 733, and 735. Here, the user sets a sequential-number inspection area with respect to the sequential number 732.

FIG. 7F illustrates example settings in a case in which the sequential number 732 has been set as a sequential-number inspection area. Because the starting number of the sequential number 732 is "001", "001" is set as the starting number. Because the sequential number 732 corresponds to "004" in the sequential number 734 on sheet 2 and "007" in the sequential number 736 on sheet 3 and thus the sequential numbers increase in increments of 3, "3" is set as the offset indicating the value of increase/decrease. Furthermore, "3" is set as the number of digits because the sequential numbers 732, 734, and 736 include three digits. Furthermore, because the same value does not continue in the inspection images in FIG. 7E, "1" is set as the interval. The same sequential numbers as those in the first copy are printed in sequential numbers 742, 744, and 746 in the second copy, and sequential numbers 752, 754, and 756 in the third copy. Accordingly, because the sequential numbers are repeatedly printed every three sheets, "3" is set as the repetition.

Note that, while setting is performed based on the number of sheets for which sequential numbers are repeated in the first embodiment, control may be performed, for example, such that an end number is set, and the number returns to the starting number if the sequential numbers increase and the end number is exceeded. By setting sequential-numbering rules as described above, collation values can be generated based on the rules even if there is no data file (reference images) such as a CSV file.

In a case in which there is a data file such as a CSV file serving as reference images for individual sheets as described above, the collation value (sequential number) in each sheet can be inspected by referring to the file. In contrast, in a case in which collation values are generated based on sequential-number generation rules, it is impossible to determine, prior to inspection, whether the collation values have been generated correctly. A failure in setting collation values correctly would result in inspection being carried without setting errors being noticed and paper being wasted as a result. Thus, in the first embodiment, a method will be described in which collation values are generated based on setting values for setting sequential numbers, and the user can check the generated collation values prior to actual inspection.

Next, the processing in step S403, in which various inspection setting values such as inspection areas and inspection levels are set in accordance with inspection settings set by the user, will be described with reference to the flowchart in FIG. 8. FIG. 8 is a flowchart for describing inspection setting processing in step S403 of FIG. 4. Note that the processing described in this flowchart is realized by the CPU 302 deploying program code stored in the ROM 304 to the RAM 303 and executing the program code.

First, in step S801, the CPU 302 obtains an inspection-target area set by the user, and setting values relating to inspection in the area, as described with reference to FIGS. 7A to 7F. Next, the processing advances to step S802, and the CPU 302 determines whether the sequential-number inspection is included in the setting values obtained in step S801. The processing advances to step S803 upon determining that the sequential-number inspection is included, and the processing advances to step S808 upon determining that the sequential-number inspection is not included. In step S803, the CPU 302 enables a sequential-numbering checking function. Here, for example, the CPU 302 establishes a state in which the "check sequential number" setting item 665 illustrated in FIG. 6B can be set. In other words, the setting item 665 is placed in a settable state if at least one area with respect to which the sequential-number inspection is to be performed has been set. Then, the processing advances to step S804, and the CPU 302 determines whether checking of sequential numbers is selected in the setting item 665, or that is, whether the checkbox in the setting item 665 is checked. The processing advances to step S805 if it is determined that the checkbox in the setting item 665 is checked and sequential numbers are to be checked, and the processing advances to step S808 if it is determined that the checkbox in setting item 665 is not checked and sequential numbers are not to be checked. In step S805, the CPU 302 duplicates the registered reference image. This is because, in variable data inspection, only one reference image is registered and the reference image is duplicated and used if the picture/pattern is the same in the case of scan inspection according to the first embodiment.

FIGS. 9A to 9C illustrate examples of reference images displayed in the area 605 of the inspection setting screen 600 illustrated in FIG. 6B in accordance with whether or not the "check sequential number" setting item 665 is set. A reference image 901 illustrated in FIG. 9A indicates a reference image for inspecting the inspection images 701, 705, and 709 illustrated in FIG. 7A.

The reference image 901 in FIG. 9A indicates a reference image that can be checked in a state in which the "check sequential number" setting item 665 is not checked in the screen in FIG. 6B and a setting is set such that sequential numbers are not to be checked. Here, areas 902, 903, and 904 are each set as a sequential-number inspection area.

Here, in a case in which the sequential-number inspection settings illustrated in FIG. 7B have been set with respect to the area 902, "004" and "007" are respectively set as collation values in the areas corresponding to the area 902 in the sheet 2 (inspection image 705) and the sheet 3 (inspection image 709) printed during inspection (see FIG. 7A). However, because the setting item 665 is not checked in this case, only the image 901 in FIG. 9A is displayed during inspection setting. Thus, the user cannot check the collation values in the reference images that will be used to perform variable data inspection with respect to the sheet 2 and subsequent sheets.

Next, a case in which the "check sequential number" setting item 665 is checked will be described with reference to FIG. 9B.

Images 911, 915, and 919 indicate reference images that can be checked in a state in which the "check sequential number" setting item 665 is checked and a setting is set such that sequential numbers are to be confirmed. These reference images 911, 915, and 919 and the inspection images 701, 705, and 709 illustrated in FIG. 7A are compared and inspected.

Each of the images 915 and 919 is an image obtained by duplicating the image 911, and is displayed in a grayed-out state so that it can be recognized that the image is a duplicate. While duplicated images are displayed in a grayed-out state in the first embodiment, the present invention is not limited to this; for example, it suffices that display of an explanation or the like or display that is different from regular image display is performed, examples of which include display of words clarifying that the images are duplicates, a change in display frame color or the state of frame lines, etc. Furthermore, while images corresponding to two sheets are created by duplication in the first embodiment, there is no limitation to this; duplication may be performed a number of times allowing the regularity in sequential numbers to be observed. Furthermore, a configuration may be adopted such that the user can specify the number of sheets to be created by duplication on an unillustrated setting screen.

The images 915 and 919, which are duplicated reference images, are displayed in the area 605 by switching display to the previous page or the next page using the buttons 610 illustrated in FIG. 6B. In the first embodiment, image display is switched by pressing the buttons 610 after a predetermined number of images have been created by duplication; however, control may be performed such that the next reference image is created by duplication and displayed as a result of the buttons 610 being pressed.

Next, the processing advances to step S806, and the CPU 302 generates collation values from the setting values of the sequential-number inspection area. Next, the processing advances to step S807, and the CPU 302 displays the collation values generated in step S806 so as to be placed above the numbers in the reference images. Here, the collation values are displayed above the sequential numbers in the reference images, as shown in sequential-number inspection areas 912, 913, 914, 916, 917, 918, 920, 921, and 922 in FIG. 9B. The collation values for the sequential-number inspection areas 916 and 920 are generated by adding the offset illustrated in FIG. 7B ("3" in this case) to the number "001" in the area 912. Furthermore, the collation values for the areas 917 and 921 are generated by adding the offset illustrated in FIG. 7B ("3") to the number "002" in the area 913. Also, the collation values for the areas 918 and 922 are generated by adding the offset illustrated in FIG. 7B ("3") to the number "003" in the area 914.

Thus, prior to actual inspection, the user can confirm whether the sequential numbers in the reference images 911, 915, and 919, which are to be compared with the inspection images 701, 705, and 709 illustrated in FIG. 7A, have been generated correctly.

Note that, here, a configuration may be adopted such that the number of reference images that are created by duplication and displayed is that allowing display to be performed repetitively up to three times the number of registered reference images, for example. Alternatively, a configuration may be adopted such that the user can set the number of reference images that can be repetitively displayed.

In FIG. 9C, the area 912 is displayed in an enlarged state, and the collation value 923 is displayed so as to be placed above the area 912. In the first embodiment, the collation values are displayed above the numbers in the reference images, but there is no limitation to this; the collation values may be displayed in a different position, or a display method such as balloon display may be adopted. Furthermore, instead of performing a vertically arranged display as in FIG. 9C, a configuration may be adopted such that a collation value is displayed as a pop-up on the inspection setting screen 600 in FIG. 6B when a sequential number area is selected, for example.

By displaying collation values that are in accordance with sequential-number setting values in a case in which sequential numbers are to be added to a plurality of reference images obtained by duplicating a reference image as described above, it can be confirmed, prior to actual inspection, whether sequential number values have been correctly set.

Then, the processing advances to step S808, and the CPU 302 determines whether the setting of the inspection area is complete. Here, the determination is made based on whether or not the OK button 611 illustrated in FIG. 6B has been pressed. Upon determining that the OK button 611 has been pressed, the processing advances to step S809, and the CPU 302 determines that the setting of inspection settings is complete. If the OK button 611 has not been pressed, the processing returns to step S801 to execute the above-described processing. In step S809, the CPU 302 stores the setting values set in the inspection setting screen to the RAM 303, and terminates this inspection setting processing.

Figure 10:
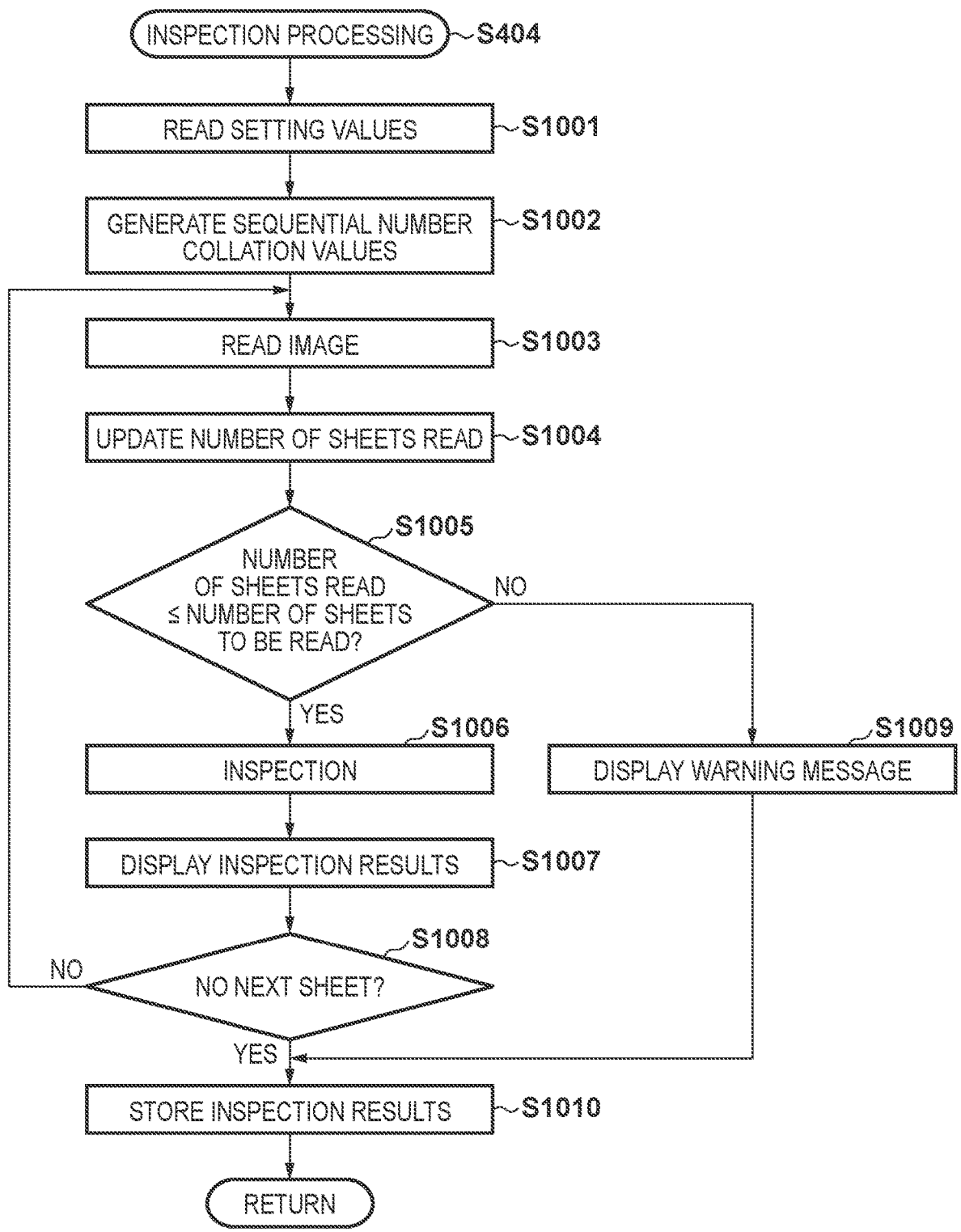
FIG. 10 is a flowchart for describing inspection processing in step S404 of FIG. 4, in which printed matters are inspected.

Next, the inspection processing in step S404, in which printed matters are inspected, will be described with reference to the flowchart in FIG. 10. FIG. 10 is a flowchart for describing the inspection processing in step S404 of FIG. 4, in which printed matters are inspected. Note that the processing described in this flowchart is realized by the CPU 302 deploying and executing program code stored in the ROM 304 in the RAM 303.

In step S1001, the CPU 302 obtains inspection setting values stored in the RAM 303. Next, the processing advances to step S1002, and the CPU 302 generates collation values to be used in the sequential-number inspection from the inspection setting values loaded in step S1001. Note that, because the inspection setting values that are loaded here are inspection setting values after it has been confirmed that collation values are correct in step S807 in the inspection setting in FIG. 8, it can be considered that the collation values that are generated based on these inspection setting values are also correct. Here, collation values for the individual sheets to be inspected are generated based on the inspection setting values. This processing is similar to the above-described processing in step S806 of FIG. 8. Then, the processing advances to step S1003, and the CPU 302 reads an inspection image. Here, when the conveyance of a printed matter (sheet) printed by the image forming apparatus 100 is sensed, the printed matter is scanned by means of the image reader 310 to obtain a scanned image of the printed matter, and the scanned image is stored to the RAM 303 of the inspection apparatus 110. Next, advancing to step S1004, the CPU 302 updates a sheet count of sheets that have been read. Here, the sheet count is incremented by one each time one sheet is read.

In step S1005, the CPU 302 determines whether the number of sheets that have been read has exceeded a scheduled number of sheets to be read. This scheduled number of sheets to be read is set in advance by the user on an illustrated setting screen. Furthermore, a configuration may be adopted in which the scheduled number of sheets to be read is received from the print server 140 as inspection job data. The processing advances to step S1006 upon determining that the scheduled number of sheets to be read has not been exceeded in step S1005, and the processing advances to step S1009 upon determining that the scheduled number of sheets to be read has been exceeded in step S1005.

In step S1006, based on the collation values generated in step S1002 and the scanned image read in step S1003, the CPU 302 performs OCR processing on one or more sequential-number inspection areas, and performs collation inspection with one or more recognized character strings. In this sequential-number inspection-number inspection, collation is performed using one or more collation values corresponding to the sheet count updated in step S1004. Furthermore, in a case in which a printed-image inspection area has been set, here, the reference image and the scanned image are compared to detect blemishes, etc. In addition, in a case in which a data inspection area has been set, scanning inspection, collation inspection, etc., are performed with respect to the data inspection area in accordance with the inspection settings of the data inspection area. Then, the processing advances to step S1007, and the CPU 302 displays the results of the inspection on the UI unit 320. Next, the processing advances to step S1008, and the CPU 302 determines whether or not there is a subsequent sheet to be read. If reading of a subsequent sheet is to be performed, the processing returns to step S1003 and the CPU 302 reads the subsequent sheet. If reading of a subsequent sheet is not to be performed, the processing advances to step S1010.

In step S1009, the CPU 302 displays, on the UI unit 320, a message screen indicating that more sheets than the scheduled number of sheets has been read, and the processing advances to step S1010. In step S1010, the CPU 302 stores the inspection results to the RAM 303, and terminates inspection. This concludes the description relating to the inspection flow in step S404.

As described up to this point, because collation values in variable data areas of reference images is able to be confirmed prior to inspection according to the first embodiment, the occurrence of printed matters determined as failures due to errors in settings of variable data areas can be suppressed.

Second Embodiment

In the above-described first embodiment, a method has been described according to which collation values for sequential-number inspection can be checked prior to inspection and setting errors can be reduced by duplicating a reference image and displaying the duplicated reference images along with collation values during the setting of settings of sequential-number inspection. However, with the method according to the first embodiment, collation values cannot be recognized easily as in the case of a list, and there is a concern that it may be difficult to check the regularity of sequential-number collation values. In view of this, in the second embodiment, a method will be described in which, without displaying reference images, collation values are listed and displayed in the form of an inspection-area setting list so that sequential-number collation values can be confirmed. In the following, portions of the second embodiment differing from the above-described first embodiment will be described. Note that the second embodiment is the same as first embodiment in regard to portions that are not described in detail.

Figure 11:
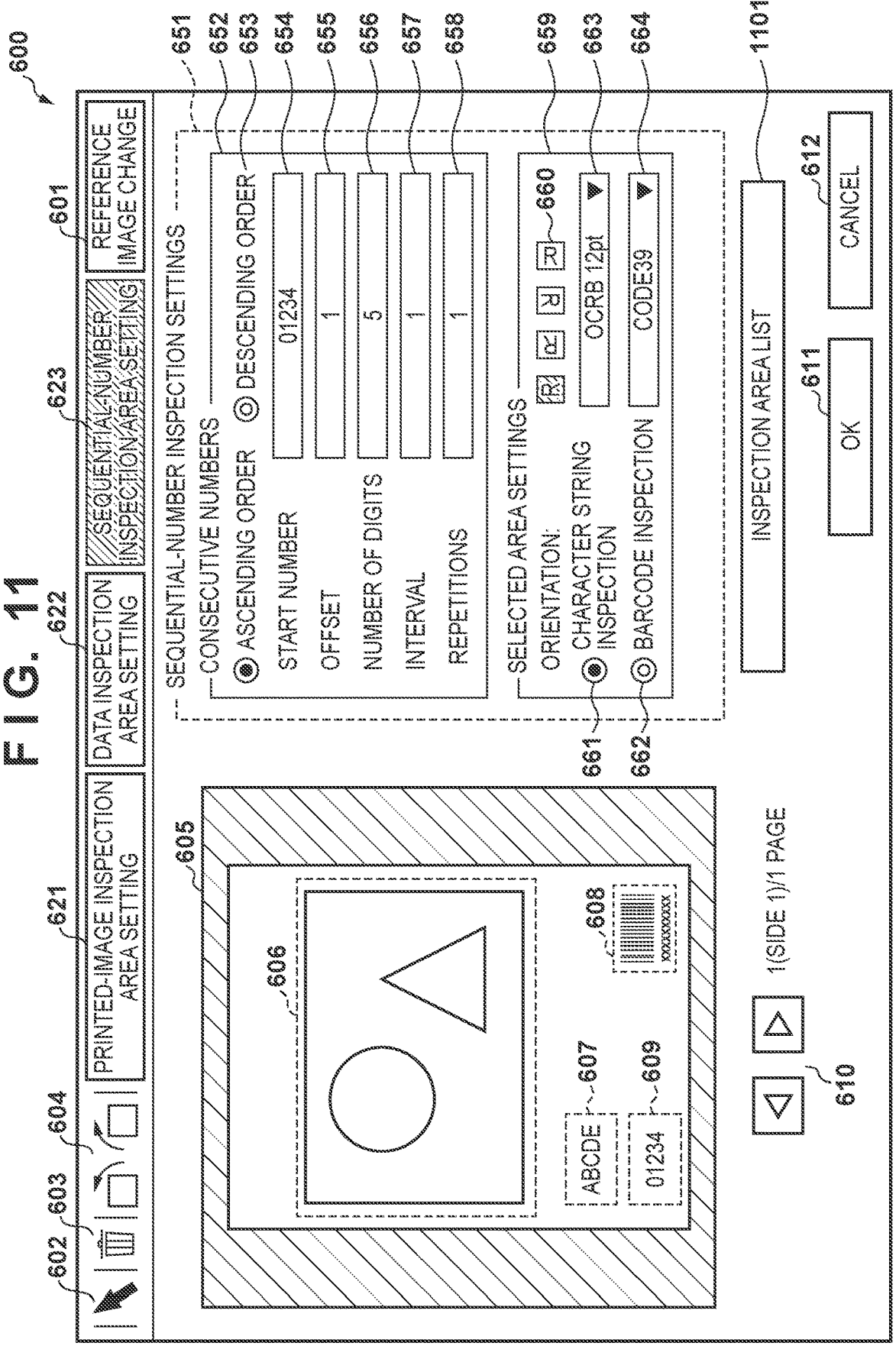
FIG. 11 is a diagram illustrating one example of an inspection setting screen in a second embodiment in a case in which the currently selected setting area is set as a sequential-number inspection area.

FIG. 11 is a diagram illustrating one example of an inspection setting screen in the second embodiment when setting of a sequential-number inspection area has been selected. Note that portions that are the same as those in FIG. 6B are indicated using the same reference numerals, and description thereof will be omitted.

An "inspection area list" button 1101 is a button for displaying inspection areas that have been set on the inspection setting screen as a list. Transition to an inspection area list screen illustrated in FIG. 12A or 12B is triggered when the "inspection area list" button 1101 is pressed.

FIGS. 12A and 12B are diagrams illustrating examples of inspection area lists in the second embodiment in a case in which the inspection settings illustrated in FIG. 7B have been set to inspect the inspection images illustrated in FIG. 7A.

FIG. 12A is a diagram illustrating one example of an inspection area list screen 1200 in the second embodiment.

A setting item 1201 is for setting whether or not collation values generated based on the sequential-number rules set in the setting area 652 in FIG. 6B are to be checked. FIG. 12A illustrates an example of a screen in a state in which the setting item 1201 is not checked and the checking of collation values is off. When an OK button 1202 is pressed, the inspection area list screen 1200 closes.

Rows 1211, 1212, and 1213 in the inspection area list indicate the settings of individual inspection areas set in a registered reference image. The row 1211 indicates the settings in a case in which the inspection settings in FIG. 7B have been set with respect to the area 702 in the sheet 1 in FIG. 7A. Accordingly, the collation value in this case is "001". The row 1212 indicates the settings in a case in which "002" has been set as the starting number in the inspection settings in FIG. 7B with respect to the area 703 in the sheet 1 in FIG. 7A. Accordingly, the collation value in this case is "002". The row 1213 indicates the settings in a case in which "003" has been set as the starting number in the inspection settings in FIG. 7B with respect to the area 704 in the sheet 1 in FIG. 7A. Accordingly, the collation value in this case is "003".

FIG. 12B illustrates the screen in a state in which the setting item 1201 has been checked and a setting has been made so that collation values are checked. Note that, in FIG. 12B, portions that are the same as those in FIG. 12A are indicated using the same reference numerals, and description thereof will be omitted.

Rows 1214 to 1219 indicate the settings for sheets which are subsequent to the registered reference image and for which reference images have not been registered (sheets 2 and 3 in this case); that is, the reference image settings applied to individual sheets expected to be printed during inspection. Here, the settings for each inspection area in each reference image to be applied during sequential-number inspection are shown. Here, the offset "3" in the inspection settings in FIG. 7B is applied to the collation values corresponding to the areas 1 to 3 in the sheets 2 and 3, and "004" to "009" are set as collation values to be actually used for collation.

Note that, while information about the sheets 2 and 3, for which no reference image is registered, is displayed in a grayed-out state in FIG. 12B, the present invention is not limited to this. For example, it sufficient that display of an explanation or the like or display that is different from display, in the list, of the sheet for which a reference image is registered is performed, examples of which include a change in the background color with which the information about the sheets 2 and 3 is displayed from that for the rows 1211 to 1213 corresponding to the registered reference image, and a change in color or display style of grid-lines.

As described above, according to the second embodiment, a product-inspection system facilitating the checking of regularity can be provided by displaying, prior to actual inspection, a list of sequential-number collation values for sheets for which reference images are not registered.

Other Embodiments

Embodiments of the present disclosure can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-154002, filed Sep. 27, 2022, which is hereby incorporated by reference herein in its entirety.

What is claimed is:

1. An inspection system comprising:
an image forming apparatus; and
an inspection apparatus,
wherein the inspection apparatus comprising:
a controller including one or more processors and one or more memories, the controller configured to:
obtain a scanned image by reading a printed matter printed by the image forming apparatus;
set an inspection target area in which inspection is to be performed on data of a variable-data area included in the scanned image;
set an inspection item for the inspection target area;
generate, in accordance with the inspection item, a collation value to which the inspection item is to be applied, in a reference image;
perform inspection by comparing the reference image including the collation value and a scanned image of an inspection-target printed matter; and
perform control so that the generated collation value is able to be confirmed prior to the inspection.

2. The inspection system according to claim 1, wherein the inspection item is a setting item relating to sequential-number inspection.

3. The inspection system according to claim 2,
wherein a plurality of inspection items set in the setting of the inspection item include at least a starting number of sequential numbers in the sequential-number inspection and a value of increase/decrease in the sequential numbers between sheets, and in the generation of the collation value, the collation value is generated based on the starting number of the sequential numbers and the value of increase/decrease in the sequential numbers.

4. The inspection system according to claim 3, wherein the inspection items further include an interval indicating whether the sequential numbers increase/decrease by the value of increase/decrease every sheet.

5. The inspection system according to claim 4, wherein the inspection items further include a repetition value enabling repetition of implementation of settings of the starting number, the value of increase/decrease, and the interval.

6. An inspection apparatus that inspects printed matters, comprising:
a controller including one or more processors and one or more memories, the controller configured to:
obtain a scanned image by reading a printed matter;
set an inspection target area in which inspection is to be performed on data of a variable-data area included in the scanned image;
set an inspection item for the inspection target area;
generate, in accordance with the inspection item, a collation value to which the inspection item is to be applied, in a reference image;
perform inspection by comparing the reference image including the collation value and a scanned image of an inspection-target printed matter; and
perform control so that the generated collation value is able to be confirmed prior to the inspection.

7. The inspection apparatus according to claim 6, wherein the inspection item is a setting item relating to sequential-number inspection.

8. The inspection apparatus according to claim 7,
wherein a plurality of inspection items set in the setting of the inspection item include at least a starting number of sequential numbers in the sequential-number inspection and a value of increase/decrease in the sequential numbers between sheets, and in the generation of the collation value, the collation value is generated based on the starting number of the sequential numbers and the value of increase/decrease in the sequential numbers.

9. The inspection apparatus according to claim 8, wherein the inspection items further include an interval indicating whether the sequential numbers increase/decrease by the value of increase/decrease every sheet.

10. The inspection apparatus according to claim 9, wherein the inspection items further include a repetition value enabling repetition of implementation of settings of the starting number, the value of increase/decrease, and the interval.

11. The inspection apparatus according to claim 6, wherein the controller is further configured to, in the confirming of the collation value, provide an instruction to display the generated collation value so that the generated collation value is able to be confirmed.

12. The inspection apparatus according to claim 11, wherein, in a case that the instruction to display the generated collation is provided, the controller duplicates a registered reference image and performs control so that the generated collation value is displayed in the inspection target area in the duplicated reference image.

13. The inspection apparatus according to claim 12, wherein, in the confirming of the collation value, the controller further displays the duplicated reference image in a display state differing from a display state of the registered reference image.

14. The inspection apparatus according to claim 12, wherein, in the confirming of the collation value, the controller displays the collation value so as to be placed above or below a sequential number in the inspection target area in the duplicated reference image.

15. The inspection apparatus according to claim 14, wherein, in the confirming of the collation value, the controller further sets a display state of the collation value different from a display state of the sequential number in the inspection target area in the duplicated reference image.

16. The inspection apparatus according to claim 11, wherein, in a case that the instruction to display the generated collation value is provided, the controller displays a list of each collation value in the inspection target area in a reference image subsequent to a registered reference image.

17. The inspection apparatus according to claim 16, wherein, when displaying the list of collation values, the controller further displays a list of sequential numbers in association with the registered reference image, and displays the sequential numbers in the registered reference image in a display state different from a display state of the collation value in the reference images subsequent to the registered reference image.

18. The inspection apparatus according to claim 6, further comprising:
a storage that stores the reference image,
wherein the controller stores, as the reference image in the storage, a scanned image obtained by reading a printed matter on which a reference image is printed.

19. A method of controlling an inspection apparatus that inspects printed matters, the method comprising:
obtaining a scanned image by reading a printed matter;
setting an inspection target area in which inspection is to be performed on data of a variable-data area included in the scanned image;
setting an inspection item for the inspection target area;
generating, in accordance with the inspection item, a collation value to which the inspection item is to be applied, in a reference image;
performing inspection by comparing the reference image including the collation value and a scanned image of the inspection-target printed matter; and
performing control so that the generated collation value is able to be confirmed prior to the inspection.

20. A non-transitory computer-readable storage medium storing a program for causing a processor to execute a method of controlling an inspection apparatus that inspects printed matters, the method comprising:
obtaining a scanned image by reading a printed matter;
setting an inspection target area in which inspection is to be performed on data of a variable-data area included in the scanned image;
setting an inspection item for the inspection target area;
generating, in accordance with the inspection item, a collation value to which the inspection item is to be applied, in a reference image;
performing inspection by comparing the reference image including the collation value and a scanned image of the inspection-target printed matter; and performing control so that the generated collation value is able to be confirmed prior to the inspection.

* * * * *